Nov. 7, 1967   F. KOHLER ETAL   3,351,882
PLASTIC RESISTANCE ELEMENTS AND METHODS FOR MAKING SAME
Filed Oct. 9, 1964
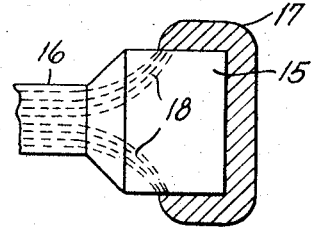
Fig. 1
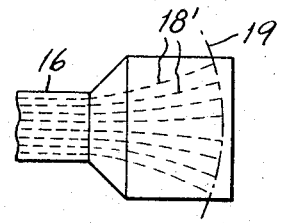
Fig. 2
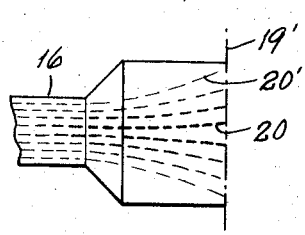
Fig. 3
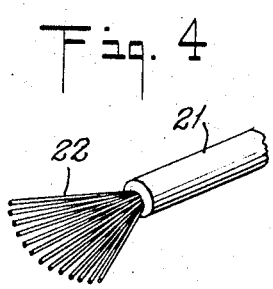
Fig. 4
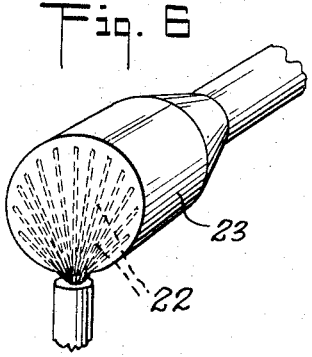
Fig. 5
Fig. 6
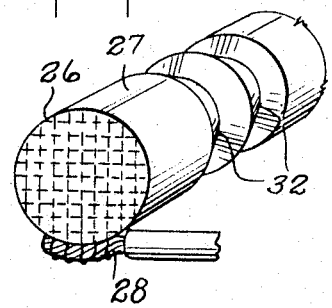
Fig. 7
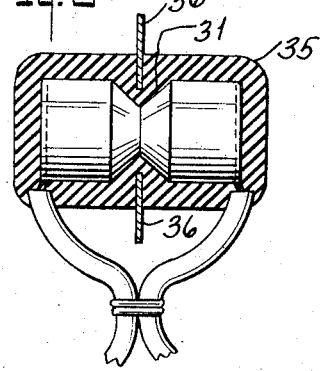
Fig. 9
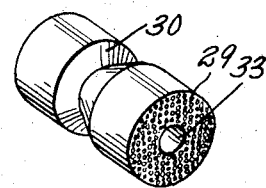
Fig. 8
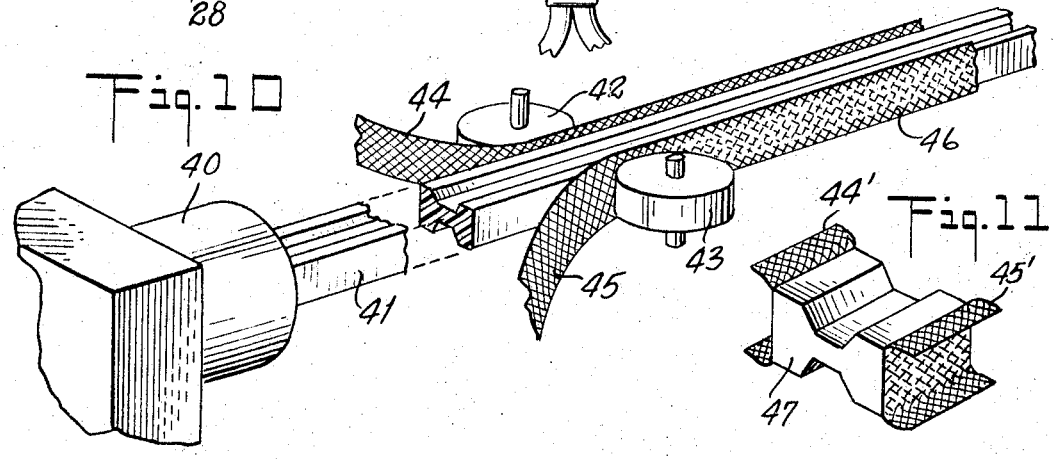
Fig. 10
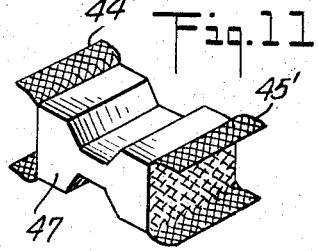
Fig. 11

United States Patent Office 3,351,882
Patented Nov. 7, 1967

3,351,882
PLASTIC RESISTANCE ELEMENTS AND
METHODS FOR MAKING SAME
Fred Kohler, New York, and Wallace C. Rudd, Larchmont, N.Y., assignors to Polyelectric Corporation, Larchmont, N.Y., a corporation of New York
Filed Oct. 9, 1964, Ser. No. 402,716
7 Claims. (Cl. 338—322)

ABSTRACT OF THE DISCLOSURE

A resistance element composed of thermoplastic polymer material and conductive particles of the type manifesting an abrupt increase in resistance when the element reaches a critical temperature is provided with "meshed" terminals embedded in the polymer material along "equal potential surfaces" transversely of the path of current flow between them, and the polymer material, at least at the region of the terminals, is cross-linked with the terminals in situ.

---

This invention relates to plastic resistance elements and methods for making same. Important aspects of the invention concern the provision of plastic resistance elements of the general types referred to below, and with suitable conductive terminals.

There has recently been developed a type of resistor comprised of finely-divided conductive particles such as, for example, carbon powder dispersed in a matrix of a relatively non-conductive plastic material, such as, for example, a polyolefin polymer such as polyethylene, and there being sufficient conductive particles dispersed throughout the matrix, so that, below a given temperature level, a multitude of the particles will normally be in contact and form a lattice with each other, thus providing a resistor which will have a relatively low and comparatively constant resistance over a considerable temperature range, but in which, when the temperature is increased above a critical level, the resistivity will quite suddenly increase, for example in a typical case by more than 250% over an increasing temperature range of 25° F. It appears that the material functions in this way because of the breaking of contacts between the carbon particles as the material is heated to the critical range. And whether this occurs as a result of differing coefficients of expansion of the components of the mixture, or whether changes in the crystallinity of the plastic at the critical range play a major part, has not been fully determined. A resistor of this type is described and claimed in the co-pending application of Fred Kohler, Ser. No. 236,943, filed Nov. 13, 1962, on which U.S. Patent No. 3,243,753 was granted on Mar. 29, 1966, and reference to which is hereby made. In typical examples of such resistors, the carbon powder may constitute from 35-45% (or preferably about 40%) by volume of the plastic-carbon powder mixture.

The construction of resistors of material of the general type above described and of such forms as to be well adapted for efficient, continued and reliable commercial use, involves certain problems. For example, in case the plastic used is polyethylene, its properties may change upon repeated cycling, i.e. heating and cooling above and below the critical temperature, and the normal softening temperature of such plastic is not as high above the critical range as would be desirable for many uses. Further, the avoidance of the excessive current concentrations at any spot near the terminals of the resistor presents problems, as does the provision of terminals in a form which will reliably distribute the current over a suitable cross-sectional area of the plastic-carbon powder mixture and without variations of such distribution on repeated cycles of operation of the device.

The present invention provides satisfactory solutions to these problems in a manner which will be hereinafter explained. However, briefly stated, in general it has been found possible to meet these difficulties by using plastic polymers which are so treated that the molecules become cross-linked, preferably in situ with the terminals embedded therein; and preferably also the terminals are of substantial areas and of a "meshed" construction, as hereinafter defined. Further aspects of the invention in its preferred forms involve novel features as to the shaping of the resistor element and positioning of the terminals therein, as well as methods for forming and assembling such devices.

Various aspects of the invention are applicable not only to resistors of the general type made of material such as above described, but also to resistors and semi-conductors comprised of a variety of other plastics, and which may embody lattices of conductive particles other than carbon, or which may be made semi-conductive by other expedients. Various examples of these alternatives will be described below.

Various further and more specific objects, features and advantages of the invention will appear from the description given below, taken in connection with the accompanying drawings, illustrating by way of example preferred forms of the invention.

In the drawings:

FIG. 1 illustrates the end portion of a resistor element of the general type above referred to, and with a terminal applied thereto shown in cross-section in the form of a metal thimble, the dotted lines indicating an undesirable distribution of the filaments of current which will flow in the end portions of the resistor with a terminal of this type;

FIG. 2 is a view similar to FIG. 1, but illustrating an ideal distribution of such filaments of current;

FIG. 3 is a view similar to FIG. 2, but showing a practically feasible distribution of the current achieved in ways hereinafter explained;

FIG. 4 is a perspective view of the end portion of a conductor formed of a fanned-out arrangement of numerous small wires which may be embedded in the end of a plastic resistor (such as above referred to) by the use of a method and means somewhat schematically indicated in FIG. 5;

FIG. 6 is a perspective view of the end portion of a typical resistor of the type here involved, and having a terminal formed in the manner shown in FIG. 5;

FIG. 7 is a view similar to FIG. 6, but showing an alternative embodiment;

FIG. 8 is a perspective view of another embodiment;

FIG. 9 is a view showing a resistor with terminals such as FIG. 6, or of FIG. 7, the resistor here being shown as "potted," or embraced in a suitable insulation enclosure means which is shown in section; and FIG. 10 is a perspective view illustrating somewhat schematically the manner in which a succession of resistor elements with terminals may be manufactured according to a somewhat different embodiment, and one of which is shown in the perspective view of FIG. 11.

One of the problems of providing a suitable terminal connection for resistors of the type here under consideration, will now be explained in connection with FIG. 1. Here a resistor formed of a plastic matrix material embodying numerous conductive particles is shown with an end portion 15 preferably considerably enlarged as compared with the cross-section or diameter of its midportion 16. A metal terminal generally of the form of a cap or thimble 17 is shown embracing the resistor end portion. While it would normally seem that such a thimble would provide a mechanically highly-desirable form of terminal, yet, as indicated by the dotted lines, the filaments of current, indicated at 18, flowing through the resistor portion 16, will branch out in the enlarged portion 15 in such manner that a greater part thereof will flow directly to the rim portions of the thimble, this being because the current will follow the paths of least resistance (i.e. the shortest paths) in the resistor material to the conductive terminal. Thus, the central end portions of the resistor will in effect be shortcircuited by the metal of the thimble and the current will become so concentrated at spots or regions located at the rim of the thimble, that these parts of the plastic will tend to become overheated, and unduly softened, possibly even before the active portions at 16 of the resistor reach the critical operating temperature. Such overheating will not only tend to cause deterioration of the plastic material, but also cause radical and undesirable variations of the paths of current flow.

The same problem will occur (as explained in connection with FIG. 1) if the conductive terminal is in the form, for example, of a ring encircling the resistor, instead of a cap or thimble, and similarly this will be the case if the terminal is in the form, for example, of a conductive strand wrapped around the end of the resistor.

As contrasted with the circumstances shown by FIG. 1, the ideal distribution of the filaments of current flow in the end of the resistor, should be as indicated at 18' in FIG. 2, where the desirable location and position of the surface of the conductive terminal is indicated by the dot and dash line 19. Such conductive surface conforms to portions of a sphere, or what will be termed an "equal potential surface," that is a surface from which each of the filaments of current, as indicated at 18' flowing therefrom along into the resistor, will follow paths all having equal voltage drops, and consequently the current will be uniformly and well distributed through the cross-section of the resistor material at the location of the conductive terminal. However, as a practical matter, this condition may, in the usual case, be approximately and adequately complied with by using a terminal principally located in a plane, as shown by the dot and dash lines at 19' in FIG. 3, such plane being perpendicular to the axis of the resistor. While here the filaments of current near the axial region (as indicated by the dotted lines 20) may account for slightly heavier current flows than those at 20' nearer the periphery, yet the current flowing to all parts of the terminal plane 19' will be sufficiently uniform for practical purposes, so that no overheated spots will occur.

One simple form of terminal which may be used is indicated in FIG. 4, comprising an insulated conductor 21, the wire being comprised of numerous flexible small copper or other good conductive metal filaments, as at 22, which are exposed and fanned out, as shown, along the surface of a plane. In order to apply this form of terminal to the end of a plastic resistor such as shown at 23 in FIG. 5, the fanned-out wire filaments may be first heated, as may also be the end of the resistor 23, and then a heated plunger, as indicated at 24, may be forced downwardly against the wire filaments, forcing them into embedded relation to the end surface 25 of the plastic material, with the result indicated in FIG. 6. Generally, the plastic is heated to a temperature near its softening point. Thus, for most polyolefin polymers, such as polyethylene, polypropylene, polyisobutylene, etc., the plastic would be heated to a temperature of the order of about 200° to 375° F., depending on the plastic in question.

Since the current flowing in the resistor is distributed over a considerable cross-sectional area of the plastic material (and desirably uniformly distributed) it is important that the numerous portions of the conductive terminal also be distributed over a considerable area to avoid overheated spots and possible excessive softening or injury to the plastic material at such spots.

A further important factor is that such distributed terminal portions should each be in such form that the plastic containing the conductive particles will in effect have a gripping relation with the small portions of the conductive terminal. That is, if the terminal is in the form of a plain metal surface, for example, or one against which the plastic composition engages largely merely by abutting same, then due to the different temperature coefficients of expansion of the plastic and of the conductive particles therein, the manner in which the latter engage the terminal surface will vary upon heating of the resistor, and thus cause undesired or even unpredictable variations in the overall resistance of the device, or interfere with its desired durability and uniform operation on repeated use. These difficulties are overcome by the use of a terminal in the form of spaced-apart small embedded wires, as shown in FIG. 6, wherein each of the wires, and some of the adjacent resistor mixture, become gripped together and remain so upon differential expansion or contraction of the plastic material and the conductive particles.

Another desirable embodiment meeting the requirements above explained, is shown in FIG. 7, wherein the terminal 26 is in the form of an area of wire mesh or wire screening embedded in the end of the resistor 27 along a plane preferably perpendicular to the axis of the latter, the wires of this mesh being suitably attached to a connection wire 28.

After the terminal wire filaments have been embedded in the heated plastic of the assembly (as above explained) and the assembly is allowed to cool, multitudes of the conductive particles will be in intimate contact with portions of the wires and remain so. Instead of using small wire strands or mesh as the terminal means, a sheet metal plate may be used, if desired, with numerous small closely-spaced perforations, as at 29 in FIG. 8, distributed over its surface, and thus approximating in effect a meshed construction, and with the plastic material containing the conductive particles filling each of the perforations, so that the terminal is, in effect, also thereby embedded in the plastic material.

For convenience, terminals of these several types, as of FIGS. 6, 7 and 8, and also as of FIG. 11, hereinafter described, and generally equivalent elements having many interstices, will be referred to in the appended claims as being of a "meshed" construction.

Another significant factor to be considered in the construction of resistors of this type, is that the end portions of the resistor preferably be of relatively large cross-sectional area as compared with the mid-portions thereof (as at 16 in FIGS. 1 to 3) wherein the desired operative effect of the resistor principally takes place, that is, where the resistor suddenly markedly increases its resistance after being heated above a critical temperature. By making the ends of the resistor of relatively large cross-section, the current therein will tend to be so distributed that such end portions will never ordinarily reach such critical temperature before the more restricted portions as at 16 reach such a temperature range, due to the greater concentration of the current within the smaller cross-section thereof. If desired, the restricted middle portion may be cyclindrical in form (as shown in FIG. 6); and in some cases, if preferred, the restriction may be in the form of an annular V-shaped groove, as at 30 in FIG. 8, or at 31, as indicated in FIG. 9. If preferred, two or more such restriction grooves may be provided, as indicated at 32 in FIG. 7. Also, if desired, the resistor may be formed with a central opening, as at 33 in FIG. 8, extending therethrough and facilitating ventilation of the interior portions against overheating.

In many cases it will be desirable that the plastic resistor element be "potted" or enclosed in an embracing insulation casing, such as indicated at 35 in FIG. 9. Such casing may be formed, for example, of any suitable known epoxy resin or silicone rubber molded in place to embrace the resistor element (including its terminals and connection wires) and this will serve to enhance the mechanical stability of the device and its connections, and protect the plastic from surface modification or deterioration effects, thereby increasing the effective life of the device, while maintaining its uniformity of operation electrically. Potting also will reduce the strain on the embedded wire terminals and cause any tension or compression that may exist to be passed through the potting compound, rather than through the material itself. It may also be advisable after plotting to fasten the two terminal wires together as shown in FIG. 9 to prevent wiring and handling strains from being transmitted to the material. When potting in epoxy, roughening of the surface of the resistor material may be desirable. In some cases, if desired, the central active small cross-sectional portion of the resistor may be surrounded by an annular sheet metal cooling fin, as at 36, cast within the insulation casing and so as to aid in prompt radiation of excessive heat upon each operation of the resistor.

Although polyethylene or other polyolefin polymers have thus far been preferred as the plastic material to be used as a matrix for the conductive particles, it is highly desirable that the plastic used should not become easily deformed or softened when heated to the critical temperature range. In other words, the resin should not (as in the case of the usual polyethylene) become readily thermoplastic at a point close to the critical temperature at which the resistance of the device is to become suddenly decreased. If the device is to undergo (as usually desired) a substantial number or a great number of cycles of operation, it should be able to resist softening until temperatures well above such critical point are reached, so that permanent deformation and deterioration of the plastic will not be able to take place, particularly in the active constricted area wherein the sharp change in resistance occurs. Also, if the conductive terminals for the resistor are to remain embedded in uniform relation to the plastic material in gripping relation thereto, the material should resist softening at whatever temperature the device may reach in the normal operation. It has been found that these problems may be effectively met, by so treating the plastic as to cause substantial cross-linking (so-called) of the polymer molecules; and, with respect to certain aspects of the invention, this is an important factor, in combination with others herein explained. In order readily to install or embed the conductive terminals in the resistor, while so doing, it is desirable that the material be in a thermoplastic state; but to overcome the operation problems above referred to, it is desirable that the molecules thereafter be cross-linked to the extent that the plastic will become relatively non-thermoplastic, especially at the regions of the terminals. Such cross-linking of the resinous material (such as polyethylene) may be accomplished by well known types of treatment, either by the use of radiation or by use of chemical additives therein and subsequent heat treatment.

For example, if the plastic is to be cross-linked by the use of radiation, then after the terminals have been embedded in the manner above described, the entire resistor may be subjected to about 50 to 100 megarads of radiation of one to two million electron volt electrons, or by using any other suitable irradiation source of similar radioactive intensity. Such irradiation may be directed, if desired, first against one side of the unit and then against the opposite side, and other areas thereof, whereby at least the outer portions of the plastic material to some depth, and preferably particularly the portions embedding the terminals, will become sufficiently cross-linked to be relatively non-thermoplastic. The portions of the plastic in gripping relation to the terminal portions will thus be cross-linked in situ.

Alternatively, if the cross-linking is to be accomplished by the use of chemical additives, the cross-linking agents should be selected so that they are not affected at the temperatures to which the thermoplastic is heated merely to soften it for receipt of the terminals, but are effective at the higher temperature levels reached during a subsequent heat treatment of the resistor. Thus the cross-linking agents are selected so as to be effective at conditions more severe than those employed during the bonding of terminals in place, and are generally of types having a threshhold of activity at a temperature level of about 20° to 200° F. greater than the temperature of bonding the softened plastic to the terminals.

Examples of suitable cross-linking agents (depending on the type of plastic to be used) are as follows:

For polyolefin polymers such as polyethylene, polypropylene, polyisobutylene, halo-derivatives of polyethylene, and copolymers or admixtures thereof, cross-linking agents such as organic peroxides may be employed.

For other thermoplastic polymers, cross-linking agents known in the art for such polymers may be utilized. Thus, for example, for epoxy resins, cross-linking agents are hexachloroendomethylene - tetraphthalic anhydride, and generally compounds containing active hydrogen, such as carboxyl and hydroxyl groups.

Cross-linking may be effected in the same heating zone as the initial step by further elevating the temperature after having embedded the metal terminals, or in a separate heating step. In either event, the temperature is sufficiently elevated so that the area around the terminal becomes cross-linked by the thermally-induced chemical reaction caused by the cross-linking additive. Generally, heating is effected by use of electric current, or in an oven. Additional heating of the midsection of the plastic element can be done by oven treatment or high frequency dielectric heating.

In general, chemical cross-linking temperatures will vary from 225° to 480° F., preferably being 325° to 450° F. The resulting resistor element, after either type of cross-linking treatment, will be relatively stiff and have a rubbery consistency, even when subjected to temperatures as high as 550° F. It has been found to retain substantially its electrical characteristics and thus may be used for a wide variety of purposes as a resistance element which will have a relatively low and nearly constant, or slowly increasing, resistance over a considerable range, but which resistance, upon reaching the critical range, will sharply increase to a much higher value.

An alternative technique for forming quantities of the resistors with meshed terminals, is somewhat diagrammatically shown in FIG. 10. Here a suitable plastic extruder 40 of some suitable known type, may be used to extrude a continuous rod 41 of the plastic material containing the conductive particles. The rod, as extruded, preferably has an I-shaped cross-section (as shown) and while same is still in heated condition shortly after leaving the extruder, it is passed between suitable rollers (as at 42, 43) or other means for pressing ribbons or strips 44 and 45 of wire mesh (or other "meshed" terminal-forming strips) against the opposite faces of the extruded plastic, and with sufficient force to cause the mesh to be embedded in the plastic surfaces, as indicated at 46. Thereafter, the elongated product may be cut into short lengths, each comprising a resistor, as shown at 47 in FIG. 11, with mesh terminals thereon, as at 44' and 45'. The strip material used for the terminals may preferably be wider than the opposite faces of the plastic, so as to provide free edges to which connection wires may be readily soldered, or otherwise attached. The cross-linking of the plastic by one of the methods above described, may be accomplished either prior or subsequent to the cutting of the strip into separate resistors.

Various aspects of the invention may be used in conjunction with a wide range of thermoplastic materials which have been made electrically conductive by incorporation of conductive particles therein, or by other techniques. Thus the invention has been found to be particularly useful with respect to polyolefin plastics such as polyethylene, polypropylene, polyisobutylene, halo-derivatives of polyethylene, such as polytetrafluoroethylene, trifluoromonochloroethylene, copolymers or admixtures thereof. In order to render the resistors of these plastic materials capable of better withstanding large numbers of cycles of operation, and to lend rigidity to the elements, a considerable percentage of thermosetting material may be added to the mixture, such as phenolformaldehyde, melamines or polyurethanes. Additionally, it can be employed with initially thermoplastic epoxy resins, thermoplastic elastomers such as silicone rubber, as well as such other thermoplastic materials as are capable of being cross-linked by either radiation, chemical agents or heat-treatment of multi-component systems.

These polymers normally will contain finely-divided conductive particles so as to make them electrically conductive. Examples of same are finely divided metals, alloys, non-metallic conductors, metal salts etc. Examples of the former are iron, copper, chromium, titanium, tungsten, platinum metals, boron, silicon, silver (possibly silver in fine colloidal form), gold and aluminum. Preferably, the finely-divided conducting particles are carbon (preferably carbon of amorphous forms, such as carbon black.) The conducting particles generally range from about .01 to 1.0 microns in size and may comprise preferably 25 to 75% of the volume of the thermoplastic element. In case materials such as polyethylene are used, the critical temperature corresponds closely to the so-called "crystallinity" point at which the binding forces between the long chain molecules tend to cease to be effective, and it is believed that this may account for the unusual property which such resistors have, of suddenly having a greatly increased resistance at temperatures above such critical point. If the resistor is made of polyethylene with about 40% by volume of carbon particles therein, its resistance at room temperature will be about one ohm-inch, which will only increase by small degrees up to temperatures of about 250° F., at which level there will be a very sharp increase in resistance with temperature, for example a 600% increase from temperatures of about 255° to 266° F.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. An electrical element comprised of normally solid firm thermoplastic polymer material capable of being cross-linked and thereby to resist softening thereof at increased temperatures, said element also embodying particles lending limited conductive properties thereto, said particles having a sufficiently smaller temperature coefficient of expansion than said polymer material whereby said properties are abruptly diminished upon reaching a predetermined temperature, and electrical circuit terminals for said element in the form of "meshed" conductive material of substantial area embedded in said polymer material, said terminals extending along approximately "equal potential surfaces" transversely of the paths of current flow between the terminals through the element, said polymer material, at least at the region of said terminals, being cross-linked with the terminals in situ.

2. An electrical resistor comprised of a normally firm and solid matrix of plastic polymer material embodying a sufficient multitude of finely-divided conductive particles having a sufficiently smaller temperature coefficient of expansion than said polymer material, whereby the resistance of the resistor remains without marked increase over a substantial temperature range below a predetermined critical temperature at which its resistance abruptly increases to a high value, said resistor having at least one intermediate portion of relatively limited cross-sectional area as compared with end portions of substantially larger cross-sectional areas; and electric circuit terminals respectively embedded in and extending over substantial cross-sectional areas of said end portions, whereby current in passing through the restricted cross-sectional portions is relatively more concentrated than in the end portions adjacent the terminals, the resistor, when heated by such current, being capable, upon reaching said critical temperature at said restricted cross-sectional portions, to thereby cause checking of the current flow, while the portions at the terminals remain firm and solid at temperatures below said critical temperature.

3. An electrical resistor in accordance with the foregoing claim 2, and in which the plastic polymer has been treated to become cross-linked at least to a substantial depth.

4. An electrical resistor in accordance with the foregoing claim 2 and in which said terminals are in the form of good conductive "meshed" material extending along approximately "equal potential surfaces" transversely of the paths of current flow between the terminals through the resistor.

5. An electrical resistor in accordance with the foregoing claim 2 and which, together with end portions of connection wires to the terminals, is "potted" by a relatively rigid covering layer cast thereabout to embrace same.

6. An electrical resistor in accordance with the foregoing claim 5 and in which said covering layer embodies cooling fin means at the region of portions of the resistor which are of relatively limited cross-sectional area.

7. An electrical resistor comprising an I-shaped body of plastic polymer material embodying a sufficient multitude of finely-divided conductive particles having a sufficiently smaller temperature coefficient of expansion than said polymer material whereby the resistance of the resistor remains without marked increase over a substantial temperature range below a predetermined critical temperature at which its resistance abruptly increases to a high value, said I-shaped body being a transverse section of a rod of the material; and electric circuit terminals of "meshed" conductive material embedded in and extending over the outwardly facing surfaces of both of the flange portions of the body, said polymer material, at least at the region of said terminals, being cross-linked with the terminals in situ.

References Cited

UNITED STATES PATENTS

| | | | |
|---|---|---|---|
| 1,925,129 | 9/1933 | Boyles | 338—330 X |
| 2,279,445 | 4/1942 | Clancy | 338—332 |
| 2,740,032 | 3/1956 | Bouyoucos | 338—331 X |
| 2,972,780 | 2/1961 | Boonstra. | |
| 3,153,561 | 10/1964 | Cooney | 174—68.5 |
| 2,462,162 | 2/1949 | Christensen et al. | |
| 3,243,753 | 3/1966 | Kohler. | |

FOREIGN PATENTS 215,968  7/1958  Australia.

OTHER REFERENCES

Yerzley, F. L.: "Vulcanization or Other Heat Treatment by Electrical Conduction," Rubber Age, November 1942, pp. 133–134.

RICHARD M. WOOD, *Primary Examiner.*

J. G. SMITH, *Assistant Examiner.*